US007818614B2

(12) United States Patent
Michaelis et al.

(10) Patent No.: US 7,818,614 B2
(45) Date of Patent: Oct. 19, 2010

(54) SYSTEM AND METHOD FOR REINTRODUCING A PROCESSOR MODULE TO AN OPERATING SYSTEM AFTER LOCKSTEP RECOVERY

(75) Inventors: Scott L. Michaelis, Plano, TX (US); Anurupa Rajkumari, Round Rock, TX (US); Sylvia K. Myer, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1066 days.

(21) Appl. No.: 10/973,075

(22) Filed: Oct. 25, 2004

(65) Prior Publication Data

US 2006/0107111 A1 May 18, 2006

(51) Int. Cl.
*G06F 11/00* (2006.01)
(52) U.S. Cl. .............................. 714/11; 714/10; 714/12
(58) Field of Classification Search ................ 714/9, 714/10, 11, 12, 13
See application file for complete search history.

(56) References Cited

U.S. PATENT DOCUMENTS

| | | | |
|---|---|---|---|
| 4,358,823 A | 11/1982 | McDonald | |
| 5,226,152 A | 7/1993 | Klug et al. | |
| 5,249,188 A | 9/1993 | McDonald | |
| 5,537,655 A * | 7/1996 | Truong | 714/12 |
| 5,675,794 A | 10/1997 | Meredith | |
| 5,751,932 A | 5/1998 | Horst et al. | |
| 5,758,058 A | 5/1998 | Milburn | |
| 5,758,085 A | 5/1998 | Kouoheris et al. | |
| 5,764,660 A | 6/1998 | Mohat | |
| 5,896,523 A | 4/1999 | Bissett | |
| 5,915,082 A * | 6/1999 | Marshall et al. | 714/11 |
| 5,991,900 A | 11/1999 | Garnett | |
| 6,065,135 A | 5/2000 | Marshall et al. | |
| 6,141,770 A | 10/2000 | Fuchs | |
| 6,148,348 A | 11/2000 | Garnett et al. | |
| 6,220,581 B1 | 4/2001 | Mueller | |
| 6,263,452 B1 * | 7/2001 | Jewett et al. | 714/11 |
| 6,330,356 B1 | 12/2001 | Sundareswaran | |
| 6,438,687 B2 | 8/2002 | Klein | |
| 6,473,869 B2 | 10/2002 | Bissett et al. | |

(Continued)

FOREIGN PATENT DOCUMENTS

WO    WO 01 45421    2/2007

OTHER PUBLICATIONS

Filed concurrently herewith, entitled "System and Method for Maintaining in a Multi-Processor System a Spare Processor That Is in Lockstep for Use in Recovering From Loss of Lockstep for Another Processor".

(Continued)

*Primary Examiner*—Bryce P Bonzo
*Assistant Examiner*—Joseph D Manoskey (57) ABSTRACT

According to one embodiment, a method comprises, responsive to detection of loss of lockstep (LOL) for a processor module in a system, setting status information stored to the system for the processor module to indicate that the processor module has an error. The method further comprises reestablishing lockstep for the processor module without shutting down the system's operating system, and updating the status information for the processor module to indicate that the processor module no longer has the error. The method further comprises causing the system's operating system to recognize that the processor module having its lockstep reestablished is available for processing.

16 Claims, 3 Drawing Sheets

U.S. PATENT DOCUMENTS

| | | | |
|---|---|---|---|
| 6,560,682 | B1 | 5/2003 | Miller et al. |
| 6,604,177 | B1 | 8/2003 | Kondo et al. |
| 6,615,366 | B1 | 9/2003 | Grochowski et al. |
| 6,625,749 | B1 | 9/2003 | Quach |
| 6,643,387 | B1 | 11/2003 | Sethuraman |
| 6,675,324 | B2 | 1/2004 | Marisetty |
| 6,687,851 | B1 | 2/2004 | Somers et al. |
| 6,735,253 | B1 | 5/2004 | Chang |
| 6,754,787 | B2 | 6/2004 | Miller et al. |
| 6,920,581 | B2 | 7/2005 | Bigbee |
| 6,948,092 | B2 | 9/2005 | Kondo |
| 6,983,018 | B1 | 1/2006 | Lin et al. |
| 7,003,691 | B2 | 2/2006 | Safford |
| 7,020,800 | B2 | 3/2006 | Fu |
| 7,042,943 | B2 | 5/2006 | Haskell |
| 7,085,959 | B2 * | 8/2006 | Safford ........................ 714/11 |
| 7,134,047 | B2 | 11/2006 | Quach |
| 7,155,721 | B2 | 12/2006 | Safford |
| 7,191,292 | B2 | 3/2007 | Chaudhry |
| 7,225,355 | B2 * | 5/2007 | Yamazaki et al. ............. 714/12 |
| 7,237,144 | B2 | 6/2007 | Safford |
| 7,251,746 | B2 | 7/2007 | Fox |
| 2002/0144177 | A1 | 10/2002 | Kondo et al. |
| 2002/0152420 | A1 | 10/2002 | Chaudhry |
| 2003/0051190 | A1 | 3/2003 | Marisetty |
| 2003/0070050 | A1 | 4/2003 | Miller et al. |
| 2003/0126498 | A1 | 7/2003 | Bigbee |
| 2003/0135711 | A1 * | 7/2003 | Shoemaker et al. ......... 712/200 |
| 2003/0140281 | A1 | 7/2003 | Fu |
| 2004/0006722 | A1 | 1/2004 | Safford |
| 2004/0019771 | A1 | 1/2004 | Quach |
| 2004/0078650 | A1 | 4/2004 | Safford |
| 2004/0078651 | A1 | 4/2004 | Safford |
| 2004/0153857 | A1 | 8/2004 | Yamazaki et al. |
| 2005/0172164 | A1 * | 8/2005 | Fox et al. ....................... 714/13 |
| 2005/0240806 | A1 * | 10/2005 | Bruckert et al. ................ 714/6 |
| 2005/0240811 | A1 | 10/2005 | Safford |
| 2005/0240829 | A1 | 10/2005 | Safford |
| 2006/0085677 | A1 | 4/2006 | Safford |
| 2006/0136672 | A1 | 6/2006 | Chaudhry |
| 2006/0248384 | A1 | 11/2006 | Safford |
| 2006/0248684 | A1 | 11/2006 | Vosbikian |

OTHER PUBLICATIONS

Filed concurrently herewith, entitled "System and Method for Establishing a Spare Processor for Recovering From Loss of Lockstep in a Boot Processor".

Filed concurrently herewith, entitled "System and Method for Using Information Relating to a Detecting Loss of Lockstep for Determining a Responsive Action".

Filed concurrently herewith, entitled "System and Method for System Firmware Causing an Operating System to Idle a Processor".

Filed concurrently herewith, entitled "System and Method for Switching the Role of Boot Processor to a Spare Processor Responsive to Detection of Loss of Lockstep in a Boot Processor".

Final Office Action dated Feb. 27, 2008 for U.S. Appl. No. 10/973,076 in the United States.

Non-Final Office Action dated Sep. 12, 2007 for U.S. Appl. No. 10/973,076 in the United States.

Notice of Allowance dated Nov. 20, 2008 for U.S. Appl. No. 10/972,835 in the United States.

Notice of Allowance dated Aug. 1, 2008 for U.S. Appl. No. 10/972,835 in the United States.

Non-Final Office Action dated Mar. 3, 2008 for U.S. Appl. No. 10/972,835 in the United States.

Final Office Action dated Nov. 21, 2007 for U.S. Appl. No. 10/972,835 in the United States.

Non-Final Office Action dated Jul. 12, 2007 for U.S. Appl. No. 10/972,835 in the United States.

Notice of Allowance dated Nov. 14, 2007 for U.S. Appl. No. 10/972,888 in the United States.

Non-Final Office Action dated Jul. 18, 2007 for U.S. Appl. No. 10/972,888 in the United States.

Notice of Allowance dated Jul. 14, 2009 for U.S. Appl. No. 10/972,588 in the United States.

Notice of Allowance dated Feb. 12, 2009 for U.S. Appl. No. 10/972,588 in the United States.

Notice of Allowance dated Sep. 23, 2008 for U.S. Appl. No. 10/972,588 in the United States.

Non-Final Office Action dated Mar. 10, 2008 for U.S. Appl. No. 10/972,588 in the United States.

Non-Final Office Action dated Sep. 12, 2007 for U.S. Appl. No. 10/972,588 in the United States.

Non-Final Office Action dated Mar. 5, 2008 for U.S. Appl. No. 10/973,003 in the United States.

Non-Final Office Action dated Sep. 12, 2007 for U.S. Appl. No. 10/973,003 in the United States.

Notice Of Allowance dated Nov. 28, 2008 for U.S. Appl. No. 10/973,076 in the United States.

Notice Of Allowance dated Jul. 16, 2008 for U.S. Appl. No. 10/973,076 in the United States.

Notice Of Allowance dated Jun. 3, 2008 for U.S. Appl. No. 10/973,076 in the United States.

Notice Of Allowance dated Dec. 19, 2007 for U.S. Appl. No. 10/972,796 in the United States.

Non-Final Office Action dated Jul. 12, 2007 for U.S. Appl. No. 10/972,796 in the United States.

Notice Of Allowance dated Aug. 1, 2007 for U.S. Appl. No. 10/973,004 in the United States.

Non-Final Office Action dated Apr. 10, 2007 for U.S. Appl. No. 10/973,004 in the United States.

Shoichi Araki, Real-Time Tracking of Multiple Moving Object Contours in a Moving Camera Image Sequence, vol. E83-D IEICE Trans. Inf. & Syst, Jul. 7, 2000, 9 pages.

Jiang-Bin Zheng, Proceedings of the First International Conference on Machine Learning and Cybernetics, Beijing, Nov. 4-5, 2002, 4 pages.

Jong Ryul Kim, Automatic Localization and Trackign of Moving Objects Using Adaptive Snake Algorithm, ICICS-PCM 2003, Dec. 15-18, 2003, 5 pages, Singapore.

Jianhoa Meng, CVEPS-A Compressed Video Editing and Parsing System, Nov. 18, 1996, pp. 1-11.

Notice of Allowance dated Jul. 23, 2009 for U.S. Appl. No. 10/973,077 in the United States.

Notice of Allowance dated Feb. 11, 2009 for U.S. Appl. No. 10/973,077 in the United States.

Notice of Allowance dated Sep. 23, 2008 for U.S. Appl. No. 10/973,077 in the United States.

Non-Final Office Action dated Mar. 19, 2008 for U.S. Appl. No. 10/973,077 in the United States.

Non-Final Office Action dated Sep. 20, 2007 for U.S. Appl. No. 10/973,077 in the United States.

* cited by examiner

SYSTEM AND METHOD FOR REINTRODUCING A PROCESSOR MODULE TO AN OPERATING SYSTEM AFTER LOCKSTEP RECOVERY

CROSS-REFERENCE TO RELATED APPLICATIONS

The present application is related to the following concurrently filed and commonly assigned U.S. patent applications: Ser. No. 10/973,077 titled "SYSTEM AND METHOD FOR ESTABLISHING A SPARE PROCESSOR FOR RECOVERING FROM LOSS OF LOCKSTEP IN A BOOT PROCESSOR"; Ser. No. 10/973,004 titled "SYSTEM AND METHOD FOR CONFIGURING LOCKSTEP MODE OF A PROCESSOR MODULE"; Ser. No. 10/973,076 titled "SYSTEM AND METHOD FOR PROVIDING FIRMWARE RECOVERABLE LOCKSTEP PROTECTION"; Ser. No. 10/972,588 titled "SYSTEM AND METHOD FOR SWITCHING THE ROLE OF BOOT PROCESSOR TO A SPARE PROCESSOR RESPONSIVE TO DETECTION OF LOSS OF LOCKSTEP IN A BOOT PROCESSOR"; Ser. No. 10/973,003 titled "SYSTEM AND METHOD FOR REESTABLISHING LOCKSTEP FOR A PROCESSOR MODULE FOR WHICH LOSS OF LOCKSTEP IS DETECTED"; Ser. No. 10/972,888 titled "SYSTEM AND METHOD FOR SYSTEM FIRMWARE CAUSING AN OPERATING SYSTEM TO IDLE A PROCESSOR"; Ser. No. 10/972,835 titled "SYSTEM AND METHOD FOR USING INFORMATION RELATING TO A DETECTED LOSS OF LOCKSTEP FOR DETERMINING A RESPONSIVE ACTION"; and Ser. No. 10/972,796 titled "SYSTEM AND METHOD FOR MAINTAINING IN A MULTI-PROCESSOR SYSTEM A SPARE PROCESSOR THAT IS IN LOCKSTEP FOR USE IN RECOVERING FROM LOSS OF LOCKSTEP FOR ANOTHER PROCESSOR", the disclosures of which are hereby incorporated herein by reference.

DESCRIPTION OF RELATED ART

Silent Data Corruption ("SDC") is a difficult problem in the computing industry. In general, SDC refers to data that is corrupt, but which the system does not detect as being corrupt. SDCs primarily occur due to one of two factors: a) a broken hardware unit or b) a "cosmic" event that causes values to change somewhere in the system. Broken hardware means that a "trusted" piece of hardware is silently giving wrong answers. For example, the arithmetic unit in a processor is instructed to add 1+1 and it returns the incorrect answer 3 instead of the correct answer 2. An example of a cosmic event is when a charged particle (e.g., alpha particle or cosmic ray) strikes a region of a computing system and causes some bits to change value (e.g., from a 0 to a 1 or from a 1 to a 0).

Numerous techniques have been developed for detecting SDC to prevent the SDC from remaining "silent" or "undetected" within a system, as well as preventing such SDC from propagating through the system. Examples of these techniques include parity-based mechanisms and error correcting codes (ECCs) on buses and memory locations, as well as checksums and/or cyclic redundancy checks (CRC) over regions of memory. Parity-based mechanisms are often employed in processors, wherein a parity bit is associated with each block of data when it is stored. The parity bit is set to one or zero according to whether there is an odd or even number of ones in the data block. When the data block is read out of its storage location, the number of ones in the block is compared with the parity bit. A discrepancy between the values indicates that the data block has been corrupted. ECCs are parity-based mechanisms that track additional information for each data block. The additional information allows the corrupted bit(s) to be identified and corrected.

Parity/ECC mechanisms have been employed extensively for caches, memories, and similar data storage arrays. In the remaining circuitry on a processor, such as data paths, control logic, execution logic, and registers (the "execution core"), it is more difficult to apply parity/ECC mechanisms for SDC detection. Thus, there is typically some unprotected area on a processor in which data corruption may occur and the parity/ECC mechanisms do not prevent the corrupted data from actually making it out onto the system bus. One approach to SDC detection in an execution core (or other unprotected area of the processor chip) is to employ "lockstep processing." Generally, in lockstep processing two processors are paired together, and the two processors perform exactly the same operations and the results are compared (e.g., with an XOR gate). If there is ever a discrepancy between the results of the lockstep processors, an error is signaled. The odds of two processors experiencing the exact same error at the exact same moment (e.g., due to a cosmic event occurring in both processors at exactly the same time or due to a mechanical failure occurring in each processor at exactly the same time) is nearly zero.

A pair of lockstep processors may, from time to time, lose their lockstep. "Loss of lockstep" (or "LOL") is used broadly herein to refer to any error in the pair of lockstep processors. One example of LOL is detection of data corruption (e.g., data cache error) in one of the processors by a parity-based mechanism and/or ECC mechanism. Another example of LOL is detection of the output of the paired processors not matching, which is referred to herein as a "lockstep mismatch." It should be recognized that in some cases the data in the cache of a processor may become corrupt (e.g., due to a cosmic event), which once detected (e.g., by a parity-based mechanism or ECC mechanism of the processor) results in LOL. Of course, unless such corrupt data is acted upon by the processor, the output of that processor will not fail to match the output of its paired processor and thus a "lockstep mismatch" will not occur. For example, suppose that a value of "1" is stored to first location of cache in each of a pair of lockstep processors and a value of "1" is also stored to a second location of cache in each of the pair of lockstep processors. Further suppose that a cosmic event occurs for a first one of the processors, resulting in the first location of its cache being changed from "1" to "0", and thus corrupted. This data corruption in the first processor is a LOL for the pair. An error detection mechanism of this first processor may detect the data corruption, thus detecting the LOL. If the processors are instructed to act on the data of their first cache locations, then a lockstep mismatch will occur as the output of each of the processors will not match. For instance, if the processors each add the data stored to the first location of their respective cache with the data stored to the second location of their respective cache, the first processor (having the corrupt data) will output a result of "1" (0+1=1) while the second processor outputs a result of "2" (1+1=2), and thus their respective outputs will not match.

By employing such techniques as parity-based error detection mechanisms and output comparisons for lockstep paired processors, SDC detection can be enhanced such that practically no SDC occurring in a processor goes undetected (and thus such SDC does not remain "silent") but instead results in detection of LOL. However, the issue then becomes how best for the system to respond to detected LOL. The traditional response to detected LOL has been to crash the system to ensure that the detected error is not propagated through the system. That is, LOL in one pair of lockstep processors in a system halts processing of the system even if other processors that have not encountered an error are present in the system. However, with the increased desire for many systems to maintain high availability, crashing the system each time LOL is detected is not an attractive proposition. This is particularly unattractive for large systems having many processors because cosmic events typically occur more frequently as the processor count goes up, which would result in much more frequent system crashes in those large systems. High availability is a major desire for many customers having large, multi-processor systems, and thus having their system crash every few weeks is not an attractive option. Of course, permitting corrupt data to propagate through the system is also not a viable option.

Prior solutions attempting to resolve at least some detected SDCs without requiring the system to be crashed have been Operating System ("OS") centric. That is, in certain solutions the OS has been implemented in a manner to recover from a detected LOL without necessarily crashing the system. This OS-centric type of solution requires a lot of processor and platform specific knowledge to be embedded in the OS, and thus requires that the OS provider maintain the OS up-to-date as changes occur in later versions of the processors and platforms in which the OS is to be used. This is such a large burden that most commonly used OSs do not support lockstep recovery.

Certain solutions have attempted to recover from a LOL without involving the OS in such recovery procedure. For instance, in one technique upon LOL being detected, firmware is used to save the state of one of the processors in a lockstep pair (the processor that is considered "good") to memory, and then both processors of the pair are reset and reinitialized. Thereafter, the state is copied from the memory to each of the processors in the lockstep pair. This technique makes the processors unavailable for an amount of time without the OS having any knowledge regarding this unavailability, and if the amount of time required for recovery is too long, the system may crash. That is, typically, if a processor is unresponsive for X amount of time, the OS will assume that the processor is hung and will crashdump the system so that the problem can be diagnosed. Further, in the event that a processor in the pair cannot be reset and reinitialized (e.g., the processor has a physical problem and fails to pass its self-test), this technique results in crashing the system.

BRIEF SUMMARY OF THE INVENTION

According to one embodiment, a method comprises, responsive to reestablishing lockstep for a processor module for which loss of lockstep was detected, reintroducing the processor module to the system's operating system, wherein said lockstep is reestablished for the processor module and the processor module is reintroduced to the operating system while the operating system remains operational. The method further comprises, responsive to the reintroducing, scheduling tasks for the processor module by the operating system.

According to one embodiment, a method comprises detecting loss of lockstep (LOL) for a processor module in a system, and reestablishing lockstep for the processor module without shutting down the system's operating system. The method further comprises causing the operating system to recognize the processor module having its lockstep reestablished.

According to one embodiment, a method comprises, responsive to detection of loss of lockstep (LOL) for a processor module in a system, setting status information stored to the system for the processor module to indicate that the processor module has an error. The method further comprises reestablishing lockstep for the processor module without shutting down the system's operating system, and updating the status information for the processor module to indicate that the processor module no longer has the error. The method further comprises causing the system's operating system to recognize that the processor module having its lockstep reestablished is available for processing.

DETAILED DESCRIPTION OF THE INVENTION

As described further herein and in concurrently filed and commonly assigned U.S. patent application Ser. No. 10/973,076 titled "SYSTEM AND METHOD FOR PROVIDING FIRMWARE RECOVERABLE LOCKSTEP PROTECTION," the disclosure of which is incorporated herein by reference, certain techniques are provided for recovering from LOL detected for a processor module in a multi-processor system. In using these exemplary techniques, system firmware instructs the system's OS to idle the processor module for which LOL was detected. Control of the processor module is then returned to the system firmware so that the system firmware can take actions to attempt to recover the lockstep. If lockstep is successfully recovered, in certain implementations, the firmware triggers the OS to again recognize the processor module and begin scheduling instructions for it.

Exemplary techniques for instructing the OS to idle a processor module in response to detection of LOL for the processor module are described in concurrently filed and commonly assigned U.S. patent application Ser. No. 10/972,888 titled "SYSTEM AND METHOD FOR SYSTEM FIRMWARE CAUSING AN OPERATING SYSTEM TO IDLE A PROCESSOR", the disclosure of which is hereby incorporated herein by reference. In certain embodiments, responsive to detecting LOL for a processor module, system firmware uses an ACPI method for instructing the OS to idle (or "eject") the processor module.

Exemplary techniques for reestablishing lockstep for a processor module for which LOL is detected are described in concurrently filed and commonly assigned U.S. patent application Ser. No. 10/973,003 titled "SYSTEM AND METHOD FOR REESTABLISHING LOCKSTEP FOR A PROCESSOR MODULE FOR WHICH LOSS OF LOCKSTEP IS DETECTED," the disclosure of which is hereby incorporated herein by reference. In certain embodiments, system firmware and the operating system (OS) interact, responsive to detected LOL for a processor module, to reestablish lockstep for the processor module.

Embodiments are described herein for reintroducing a processor module to the OS after lockstep is reestablished for the processor module. In certain embodiments, responsive to LOL being detected for a processor module, the system firmware instructs the OS to idle the processor, such as described in concurrently filed and commonly assigned U.S. patent application Ser. No. 10/972,888 titled "SYSTEM AND METHOD FOR SYSTEM FIRMWARE CAUSING AN OPERATING SYSTEM TO IDLE A PROCESSOR". The OS idles the processor module and returns control of the processor module to the system firmware, wherein system firmware takes actions to attempt to reestablish lockstep for the processor module, such as described in concurrently filed and commonly assigned U.S. patent application Ser. No. 10/973,003 titled "SYSTEM AND METHOD FOR REESTABLISHING LOCKSTEP FOR A PROCESSOR MODULE FOR WHICH LOSS OF LOCKSTEP IS DETECTED." If lockstep is successfully recovered, in certain implementations, the system firmware triggers the OS to again recognize the processor module and begin scheduling instructions for it. Accordingly, embodiments described herein provide techniques for reintroducing a processor module to the OS after the processor module's lockstep is reestablished. In certain embodiments, the system firmware uses a standard method for causing the OS to recognize the now-healthy processor module as available for processing instructions, wherein the OS is not required to be implemented for a specific processor architecture or platform. For instance, in certain embodiments, ACPI methods are leveraged for triggering the OS to recognize a processor module after its lockstep is recovered. Accordingly, any ACPI-compatible OS can support this technique reintroducing to the OS a processor module that has had its lockstep recovered. Thus, certain embodiments hereof enable a processor module having LOL detected to have its lockstep reestablished, and then the processor module is reintroduced to the OS for use in processing instructions, which enables recovery from LOL without crashing the system.

Figure 1:
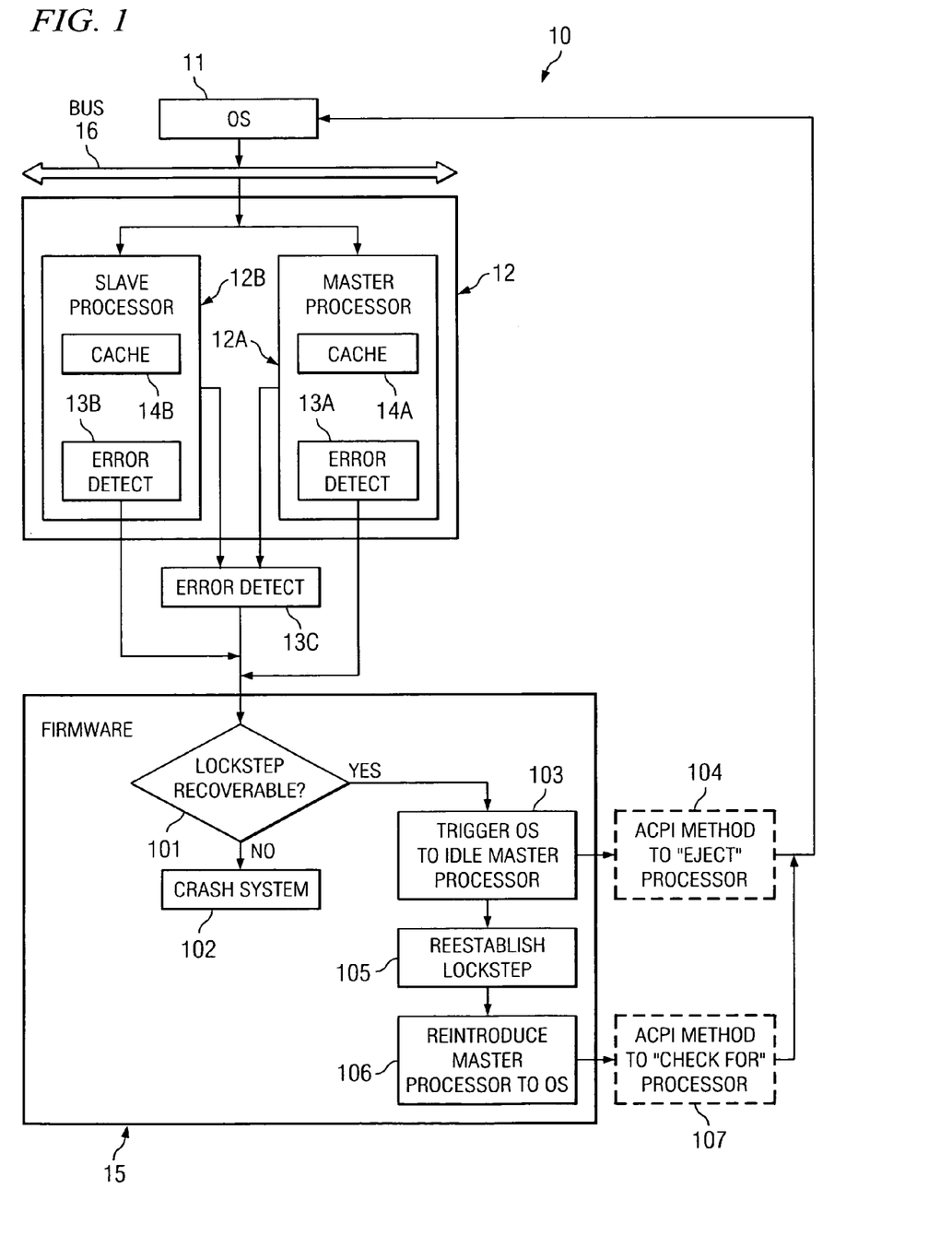
FIG. 1 shows an exemplary system according to one embodiment in which system firmware and an operating system interact to reintroduce a processor module to the operating system after lockstep is reestablished on the processor module following detection of a loss of lockstep (LOL)

Turning to FIG. 1, an exemplary system 10 according to one embodiment is shown. System 10 includes OS 11, as well as master processor 12A and slave processor 12B (collectively referred to as a lockstep processor pair 12). In certain implementations the lockstep processor pair 12 may be implemented on a single silicon chip, which is referred to as a "dual core processor" in which master processor 12A is a first core and slave processor 12B is a second core. Further, lockstep processor pair 12 may be referred to as a processor or CPU "module" because it includes a plurality of processors (12A and 12B) in such module. Master processor 12A includes cache 14A, and slave processor 12B includes cache 14B. OS 11 and lockstep processor pair 12 are communicatively coupled to bus 16. Typically, master processor 12A and slave processor 12B are coupled to bus 16 via an interface that allows each of such processors to receive the same instructions to process, but such interface only communicates the output of master processor 12A back onto bus 16. The output of slave processor 12B is used solely for checking the output of mater processor 12A. While only one lockstep processor pair 12 is shown for simplicity in the example of FIG. 1, system 10 may include any number of such lockstep processor pairs. As one specific example, system 10 may have 64 lockstep processor pairs, wherein the master processors of the pairs may perform parallel processing for the system.

In this example, master processor 12A includes error detect logic 13A, and slave processor 12B includes error detect logic 13B. While shown as included in each of the processors 12A and 12B in this example, in certain embodiments the error detect logic 13A and 13B may be implemented external to processors 12A and 12B. Error detect logic 13A and 13B include logic for detecting errors, such as data cache errors, present in their respective processors 12A and 12B. Examples of error detect logic 13A and 13B include known parity-based mechanisms and ECC mechanisms. Error detect logic 13C is also included, which may include an XOR (exclusive OR) gate, for detecting a lockstep mismatch between master processor 12A and slave processor 12B. As mentioned above, a lockstep mismatch refers to the output of master processor 12A and slave processor 12B failing to match. While shown as external to the lockstep processor pair 12 in this example, in certain embodiments error detect logic 13C may be implemented on a common silicon chip with processors 12A and 12B.

Lockstep mismatch is one way of detecting a LOL between the master processor 12A and slave processor 12B. A detection of an error by either of error detect logic 13A and 13B also provides detection of LOL in the processors 12A and 12B. Because the detection of LOL by error detect logic 13A and 13B may occur before an actual lockstep mismatch occurs, the detection of LOL by error detect logic 13A and 13B may be referred to as a detection of a "precursor to lockstep mismatch". In other words, once an error (e.g., corrupt data) is detected by error detect logic 13A or 13B, such error may eventually propagate to a lockstep mismatch error that is detectable by error detect logic 13C.

Firmware 15 is also included in system 10, which in this embodiment is invoked upon an error being detected by any of the error detect logics 13A, 13B, and 13C. In certain embodiments, processors 12A and 12B are processors from the Itanium Processor Family (IPF). IPF is a 64-bit processor architecture co-developed by Hewlett-Packard Company and Intel Corporation, which is based on Explicitly Parallel Instruction Computing (EPIC). IPF is a well-known family of processors. IPF includes processors such as those having the code names of MERCED, MCKINLEY, and MADISON. In addition to supporting a 64-bit processor bus and a set of 128 registers, the 64-bit design of IPF allows access to a very large memory (VLM) and exploits features in EPIC. While a specific example implementation of one embodiment is described below for the IPF architecture, embodiments for idling a processor in response to a detected LOL as described herein are not limited in application to an IPF architecture, but may be applied as well to other architectures (e.g., 32-bit processor architectures, etc.).

Processor architecture generally comprises corresponding supporting firmware, such as firmware 15 of system 10. For example, as described further below in conjunction with the specific example of FIG. 2, the IPF processor architecture comprises such supporting firmware as Processor Abstraction Layer (PAL), System Abstraction Layer (SAL), and Extended Firmware Interface (EFI). Such supporting firmware may enable, for example, the OS to access a particular function implemented for the processor. For instance, the OS may query the PAL as to the size of the cache implemented for the processor, etc. Other well-known functions provided by the supporting firmware (SAL, EFI) include, for example: (a) performing I/O configuration accesses to discover and program the I/O Hardware (SAL_PCI_CONFIG_READ and SAL_PCI_CONFIG_WRITE); (b) retrieving error log data from the platform following a Machine Check Abort (MCA) event (SAL_GET_STATE_INFO); (c) accessing persistent store configuration data stored in non-volatile memory (EFI variable services: GetNextVariableName, GetVariable and SetVariable); and accessing the battery-backed real-time clock/calendar (EFI GetTime and SetTime). Accordingly, the supporting firmware, such as the PAL, is implemented to provide an interface to the processor(s) for accessing the functionality provided by such processor(s). Each of those interfaces provide standard, published procedure calls that are supported. While shown as external to the lockstep processor pair 12 in this example, in certain embodiments all or a portion of firmware 15 may be implemented on a common silicon chip with processors 12A and 12B.

In the example embodiment of FIG. 1, upon firmware 15 being invoked responsive to detection of LOL for processor module 12 (by any of error detect logics 13A, 13B, and 13C), firmware 15 determines, in operational block 101, whether the detected LOL is a recoverable LOL. That is, firmware 15 determines in block 101 whether the detected LOL is of a type from which the firmware can recover lockstep for the lockstep processor pair 12 without crashing the system. If the lockstep is not recoverable from the detected LOL, then in the example of FIG. 1 firmware 15 crashes the system in block 102.

In this example, firmware 15 is implemented in a manner that allows for recovery from certain detected errors without requiring that OS 11 be implemented with specific knowledge for handling such recovery. However, if the lockstep is determined to be recoverable, firmware 15 cooperates with OS 11 via standard OS methods to recover the lockstep. For instance, in the example embodiment of FIG. 1, Advanced Configuration and Power Interface (ACPI) methods are used by firmware 15 to cooperate with OS 11. Accordingly, no processor or platform specific knowledge is required to be embedded in OS 11, but instead any ACPI-compatible OS may be used, including without limitation HP-UX and Open VMS operating systems.

In the example embodiment of FIG. 1, if lockstep is determined to be recoverable in block 101, then firmware 15 triggers OS 11 to idle the master processor 12A in block 103. In this embodiment, firmware 15 utilizes an ACPI method 104 to "eject" master processor 12A, thereby triggering OS 11 to idle the master processor 12A (i.e., stop scheduling tasks for the processor). Of course, by idling master processor 12A, slave processor 12B will in turn be idled. Thus, idling master processor 12A results in idling the lockstep processor pair 12. In this example embodiment, OS 11 is not aware of the presence of slave processor 12B, but is instead aware of master processor 12A. The interface of lockstep processor pair 12 to bus 16 manages copying to slave processor 12B the instructions that are directed by OS 11 to master processor 12A. Thus, firmware 15 need not direct OS 11 to eject slave processor 12B, as OS 11 is not aware of such slave processor 12B in this example implementation. Again, by idling master processor 12A, slave processor 12B is also idled as it merely receives copies of the instructions directed to master processor 12A. Of course, if in a given implementation OS 11 is aware of slave 12B, firmware 15 may be implemented to also direct OS 11 to idle such slave processor 12B in a manner similar to that described for idling master processor 12A.

Firmware 15 then attempts to recover lockstep for the lockstep processor pair 12 in block 105. For instance, firmware 15 resets the processor pair 12. During such reset of processor pair 12, system 10 can continue to operate on its remaining available processors (not shown in FIG. 1).

Once the processor pair 12 is reset and lockstep is recovered, firmware 15 reintroduces master processor 12A to OS 11 in operational block 106. In this embodiment, firmware 15 updates the ACPI device table information for master processor 12A to indicate that such master processor 12A is "present, functioning and enabled." As discussed in the ACPI 2.0 specification for the _STA status method of a device, the _STA (status) object returns the status of a device, which can be one of the following: enabled, disabled, or removed. In this respect, in the result code (bitmap) bit 0 is set if the device is present; bit 1 is set if the device is enabled and decoding its resources; bit 2 is set if the device should be shown in the UI; bit 3 is set if the device is functioning properly (cleared if the device failed its diagnostics); bit 4 is set if the battery is present; and bits 5-31 are reserved. A device can only decode its hardware resources if both bits 0 and 1 are set. If the device is not present (bit 0 cleared) or not enabled (bit 1 cleared), then the device must not decode its resources. Bits 0, 1 and 3 are the "present, enabled and functioning" bits mentioned above. Firmware 15 utilizes an ACPI method 107 to trigger OS 11 to "check for" master processor 12A, thereby reintroducing the master processor 12A to OS 11. As a result of checking for master processor 12A, OS 11 will recognize that such master processor 12A is again available and will thus begin scheduling tasks for master processor 12A once again.

Exemplary techniques for recovering from a detected LOL that may be employed are described further in concurrently filed and commonly assigned U.S. patent application Ser. No. 10/973,076 titled "SYSTEM AND METHOD FOR PROVIDING FIRMWARE RECOVERABLE LOCKSTEP PROTECTION," the disclosure of which is incorporated herein by reference. Embodiments provided herein further discuss techniques for reintroducing a processor module to the OS after lockstep is reestablished for the processor module. Embodiments provided herein do not require that the OS be implemented with processor-specific information to receive notice that the processor module whose lockstep has been reestablished is available for processing instructions. That is, the OS is not required to be developed specifically for a certain processor architecture in order to recognize a processor module after its lockstep is reestablished. For instance, in certain embodiments, standard OS methods, such as ACPI methods, are used for reintroducing the processor module to the OS. Thus, in certain embodiments, any ACPI-compatible OS can receive notice that a processor module whose lockstep has been reestablished is available for processing instructions, and responsive to such notice the OS can begin scheduling instructions for the processor module in the manner described herein. Further, in certain embodiments, upon detection of LOL for a processor module, control of the processor module is passed to the system firmware for reestablishing its lockstep, and after lockstep is reestablished, control of the processor module is passed to the OS. Exemplary interactions between the OS and the firmware for recovering lockstep for a processor module and reintroducing the processor module to the OS are described herein.

Figure 2:
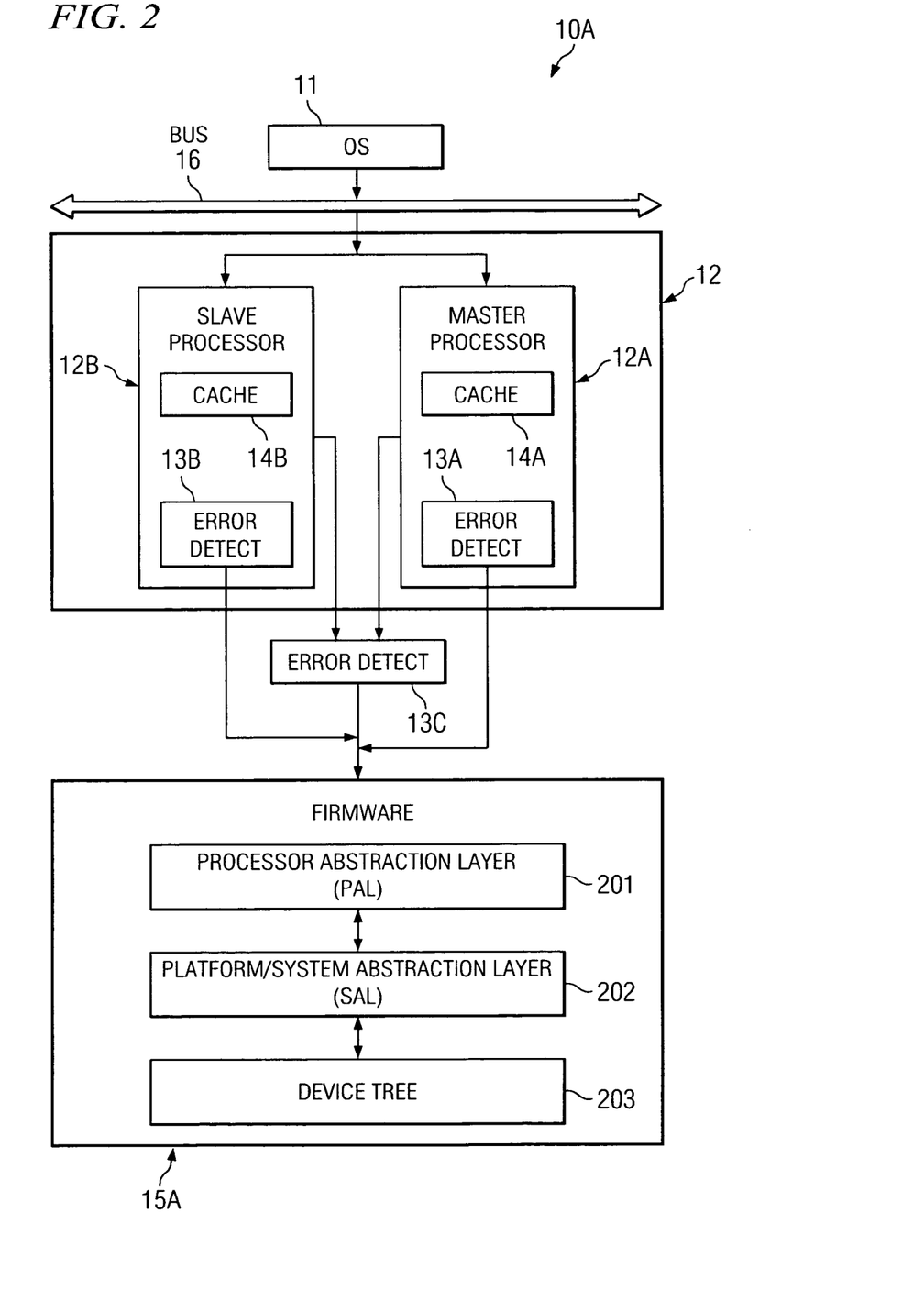
FIG. 2 shows a block diagram of one embodiment implemented for the IA-64 processor architecture.

FIG. 2 shows a block diagram of one embodiment of the above system 10, which is implemented for the IPF processor architecture and is labeled as system $10_A$. The quintessential model of the traditional IPF architecture is given in the Intel IA-64 Architecture Software Developer's Manual, Volume 2: IA-64 System Architecture, in section 11.1 *Firmware Model*, the disclosure of which is hereby incorporated herein by reference. Accordingly, in this example embodiment of system $10_A$, firmware 15, labeled as firmware $15_A$, includes processor abstraction layer (PAL) 201 and platform/system abstraction layer (SAL) 202. In general, PAL 201 is firmware provided by Intel for its processors, and SAL 202 is developed by an original equipment manufacturer (OEM) for the specific system/platform in which the processors are to be employed. PAL 201, SAL 202, as well as an extended firmware interface (EFI) layer (not shown), together provide, among other things, the processor and system initialization for an OS boot in an IPF system.

It should be noted that while the above description of PAL and SAL is specific to the IPF architecture, other architectures may include a "PAL" and "SAL" even though such firmware layers may not be so named or specifically identified as separate layers. In general, such a PAL layer may be included in a given system architecture to provide an interface to the processor hardware. The interface provided by the PAL layer is generally dictated by the processor manufacturer. Similarly, a SAL layer may be included in a given system architecture to provide an interface from the operating system to the hardware. That is, the SAL may be a system-specific interface for enabling the remainder of the system (e.g., OS, etc.) to interact with the non-processor hardware on the system and in some cases be an intermediary for the PAL interface.

The boot-up process of a traditional IPF system, for example, proceeds as follows: When the system is first powered on, there are some sanity checks (e.g., power on self-test) that are performed by microprocessors included in the system platform, which are not the main system processors that run applications. After those checks have passed, power and clocks are given to a boot processor (which may, for example, be master processor 12A). The boot processor begins executing code out of the system's Read-Only Memory (ROM) (not specifically shown in FIG. 2). The code that executes is the PAL 201, which gets control of system 10. PAL 201 executes to acquire all of the processors in system $10_A$ (recall that there may be many lockstep processor pairs 12) such that the processors begin executing concurrently through the same firmware.

After it has performed its duty of initializing the processor(s), PAL 201 passes control of system $10_A$ to SAL 202. It is the responsibility of SAL 202 to discover what hardware is present on the system platform, and initialize it to make it available for the OS 11. When main memory is initialized and functional, the firmware $15_A$ is copied into the main memory. Then, control is passed to EFI (not shown), which is responsible for activating boot devices, which typically includes the disk. The EFI reads the disk to load a program into memory, typically referred to as an operating system loader. The EFI loads the OS loader into memory, and then passes it control of system $10_A$ by branching the boot processor into the entry point of such OS loader program.

The OS loader program then uses the standard firmware interfaces to discover and initialize system $10_A$ further for control. One of the things that the OS loader typically has to do in a multi-processor system is to retrieve control of the other processors (those processors other than the boot processor). For instance, at this point in a multi-processor system, the other processors may be executing in do-nothing loops. In an ACPI-compatible system, OS 11 makes ACPI calls to parse the ACPI tables to discover the other processors of a multi-processor system in a manner as is well-known in the art. Then OS 11 uses the firmware interfaces to cause those discovered processors to branch into the operating system code. At that point, OS 11 controls all of the processors and the firmware $15_A$ is no longer in control of system $10_A$.

As OS 11 is initializing, it has to discover from the firmware $15_A$ what hardware is present at boot time. And in the ACPI standards, it also discovers what hardware is present or added or removed at run-time. Further, the supporting firmware (PAL, SAL, and EFI) are also used during system runtime to support the processor. For example, OS 11 may access a particular function of master processor 12A via the supporting firmware $15_A$, such as querying PAL 201 for the number, size, etc., of the processor's cache 14A. Some other well-known firmware functions that OS 11 may employ during runtime include: (a) PAL 201 may be invoked to configure or change processor features such as disabling transaction queuing (PAL_BUS_SET_FEATURES); (b) PAL 201 may be invoked to flush processor caches (PAL_CACHE_FLUSH); (c) SAL 202 may be invoked to retrieve error logs following a system error (SAL_GET_STATE_INFO, SAL_CLEAR_STATE_INFO); (d) SAL 202 may be invoked as part of hot-plug sequences in which new I/O cards are installed into the hardware (SAL_PCI_CONFIG_READ, SAL_PCI_CONFIG_WRIT); (e) EFI may be invoked to change the boot device path for the next time the system reboots (SetVariable); (f) EFI may be invoked to change the clock/calendar hardware settings; and (g) EFI may be invoked to shutdown the system (ResetSystem).

A "device tree" is provided, which is shown as device tree 203 in this example. Device tree 203 is stored in SRAM (Scratch RAM) on the cell, which is RAM that is reinitialized. Firmware 15A builds the device tree 203 as it discovers what hardware is installed in the system. Firmware then converts this information to the ACPI tables format and presents it to OS 11 so that OS 11 can know what is installed in the system. The ACPI device tables (not shown) are only consumed by OS 11 at boot time, so they are never updated as things change. For OS 11 to find the current status, it calls an ACPI "method" to discover the "current status". The _STA method described above is an example of such an ACPI method. When _STA is called, the AML can look for properties on the device specified in the firmware device tree and convert that into the Result Code bitmap described above. So, if lockstep has been lost on a processor, firmware 15A will set the device tree property that indicates loss of lockstep, then when OS 11 calls _STA for that device, the "lockstep lost" property directs the AML code to return to "0" in the "functioning properly" bit so that OS 11 can know there is a problem with that processor.

A simple example of device tree 203 is shown below in Table 1:

TABLE 1

| Device | Status | Lockstep Enabled |
|---|---|---|
| Processor A | Present, Enabled, and Functioning | Yes |

As mentioned above, once LOL is detected for a processor module, system firmware (e.g., SAL) may notify the OS that the processor module is to be idled (or "ejected"). Further, in certain embodiments, system firmware resumes control over the processor module and takes actions in attempt to reestablish its lockstep. Once lockstep is reestablished on the processor module, it may be desirable for the system firmware to reintroduce the processor module to the OS so that the OS can begin scheduling tasks for the processor module. Exemplary embodiments are provided herein for reintroducing to the OS a processor module that has had its lockstep reestablished responsive to detection of a LOL for such processor module.

Figure 3:
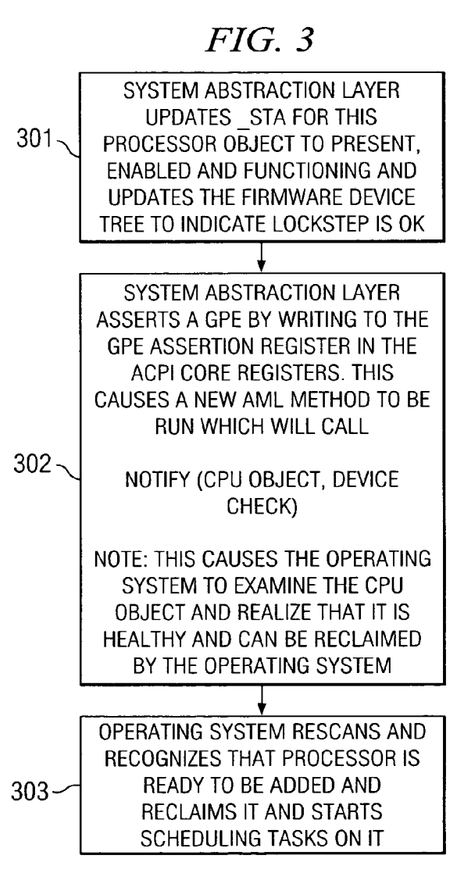
FIG. 3 shows an exemplary operational flow diagram according to one embodiment.

FIG. 3 shows an exemplary operational flow diagram of one embodiment. The operational flow diagram of FIG. 3 illustrates operation of one embodiment for reintroducing a processor module to the OS after the processor module's lockstep is reestablished responsive to a detected LOL. As shown, in this example after lockstep has been reestablished on a processor module, system firmware (e.g., SAL) sets the ACPI_STA method to indicate that the processor module is Present, Enabled and Functioning, in operational block 301. SAL also updates the firmware device tree node associated with this processor object to indicate that the processor is functioning normally with lockstep protection on.

In operational block 302, SAL asserts a General Purpose Event (GPE) Interrupt by writing to the GPE assertion register. This causes the OS to execute its interrupt handler, which will run an ACPI Machine Language ("AML") Method associated with this particular interrupt. In this example, this AML method that is executed responsive to the interrupt generated by the GPE includes an AML instruction called "Notify". This "Notify" operation includes an indication of the CPU object that has lost lockstep (i.e., identifies which processor module lost its lockstep) and "Device Check" as arguments. This AML instruction causes the OS to examine the processor module object (e.g., examine the _STA status for this processor module) and realize that it is healthy and can be reclaimed by the OS (e.g., because the _STA is set to "Present, Enabled, and Functioning"). After writing to the GPE Assertion register, SAL places the processor module in an idle loop, waiting for it to be claimed by the OS.

Once the OS receives the Notify event, in operational block 303, the OS determines that _STA for the processor module object indicates that the processor module is healthy and ready to be claimed, and thus the OS claims control of the processor from the system firmware. The OS can then begin using the processor module just as it would after an initial boot-up in which the OS claims control of the processor module from the system firmware.

Figure 4:
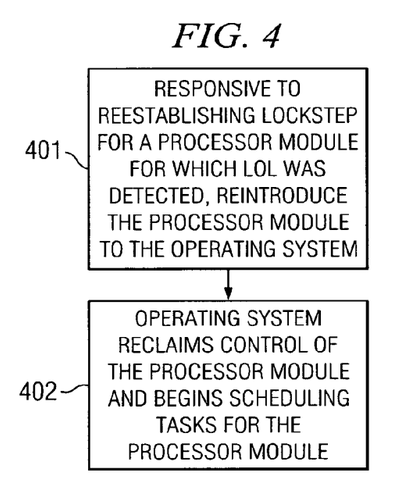
FIG. 4 shows a more general operational flow diagram for certain embodiments.

The exemplary procedure provided in FIG. 3 reintroduces to the OS a processor module having its lockstep reestablished in accordance with one embodiment. While an exemplary operational flow is provided in FIG. 3, embodiments hereof are not limited to that illustrative example. For instance, FIG. 4 shows a more general operational flow diagram for certain embodiments. In operational block 401, responsive to reestablishing lockstep for a processor module for which LOL was detected, a processor module is reintroduced to the OS. As described above, in certain embodiments, system firmware has control of the processor module for reestablishing its lockstep, and the system firmware reintroduces the processor module to the OS. Further, in certain embodiments, the system firmware reintroduces the processor module the OS by setting a status of the processor module (e.g., in the ACPI _STA) indicating that the processor module is ready to be used for processing instructions, and then causing the OS to check the status of the processor module so that the OS will recognize that the processor module is available for use.

In operational block 402, the OS reclaims control of the processor module and begins scheduling tasks for the processor module. Thus, in certain embodiments, once the OS recognizes (from the status of the processor module) that the processor module is available for processing, the OS claims control of the processor module from the system firmware much like when the OS claims control of the processor module from the system firmware in the system's boot-up process. In view of the above, embodiments hereof enable a processor module to have its lockstep reestablished and the OS can begin using the processor module without requiring that the system be crashed or re-booted.

What is claimed is:

1. A method comprising:
 responsive to detecting LOL for one processor module of a plurality of processor modules, causing an operating system to idle the processor module and pass control over the idled processor module to system firmware;
 responsive to reestablishing lockstep for the processor module for which loss of lockstep (LOL) was detected, reintroducing the processor module to the operating system, wherein said lockstep is reestablished for the processor module and the processor module is reintroduced to the operating system while the operating system remains operational on at least some of the plurality of processor modules; and
 responsive to said reintroducing, scheduling tasks for the processor module by the operating system.

2. The method of claim 1 wherein said reestablishing comprises:
 resetting the processor module.

3. The method of claim 1 wherein said system firmware performs said reintroducing.

4. The method of claim 1 wherein said reintroducing comprises:
 system firmware updating status information stored to non-volatile data storage to indicate that the processor module is functioning properly; and
 said system firmware using an Advanced Configuration and Power Interface (ACPI) method to notify the operating system to check the status information.

5. A method comprising:
 detecting loss of lockstep (LOL) for one of a plurality of processor modules in a computer system;
 idling the processor module for which LOL was detected;
 responsive to said detecting said LOL for the processor module, causing an operating system to pass control over the idled processor module to system firmware, wherein said system firmware performs said reestablishing lockstep;
 reestablishing, by said system firmware, lockstep for the processor module without shutting down the computer system's operating system, wherein the operating system remains operational on at least some of the plurality of processor modules during said reestablishing; and
 causing the operating system to recognize the processor module having its lockstep reestablished, wherein said causing the operating system to recognize the processor module having its lockstep reestablished comprises said system firmware returning control over the processor module to the operating system.

6. The method of claim 5 wherein said causing the operating system to recognize the processor module comprises:
 causing said operating system to recognize that said processor module having its lockstep reestablished as available for processing instructions.

7. The method of claim 5 further comprising:
 said operating system scheduling tasks for the processor module.

8. A method comprising:
 responsive to detection of loss of lockstep (LOL) for one of a plurality of processor modules in a system, setting status information stored to the system for the processor module to indicate that the processor module has an error;
 responsive to said status information indicating that the processor module has an error, idling said processor module by the system's operating system and passing control over the idled processor module from the system's operating system to system firmware;
 reestablishing lockstep for the processor module without shutting down the system's operating system, wherein the operating system remains operational on at least some of the plurality of processor modules during said reestablishing;
 updating the status information for the processor module to indicate that the processor module no longer has the error; and
 causing the system's operating system to recognize that the processor module having its lockstep reestablished is available for processing, wherein the system's operating system resumes control over the processor module.

9. The method of claim 8 wherein said causing the system's operating system to recognize that the processor module having its lockstep reestablished is available for processing further comprises:
    causing the operating system to recognize from the status information that said processor module is available for processing.

10. The method of claim 8 wherein the system's operating system is an Advanced Configuration and Power Interface (ACPI) compatible operating system, and wherein said causing the system's operating system to recognize that the processor module having its lockstep reestablished is available for processing further comprises:
    using an ACPI method to cause the system's operating system to recognize from the status information that said processor module is available for processing.

11. The method of claim 8 wherein system firmware performs said setting the status information, reestablishing lockstep, updating the status information, and causing the system's operating system to recognize that the processor module having its lockstep reestablished is available for processing.

12. A system comprising:
    a plurality of processor modules, each of said plurality of processor modules individually operating in lockstep;
    an operating system for scheduling instructions for the plurality of processor modules;
    error detection logic for detecting loss of lockstep (LOL) for one of the plurality of processor modules; and
    system firmware operable, responsive to detection of LOL for the processor module, to
        (a) cause the operating system to idle said one processor module and pass control over said one processor module to the system firmware,
        (b) reestablish lockstep for said one processor module without shutting down the operating system, wherein the operating system remains operational on at least some of the plurality of processor modules during said reestablishing, and
        (c) return control over said one processor module having its lockstep reestablished to the operating system.

13. The system of claim 12 wherein said one processor module comprises an Itanium Processor Family (IPF) processor.

14. The system of claim 12 wherein said operating system is an Advanced Configuration and Power Interface (ACPI) compatible operating system.

15. The system of claim 14 wherein said system firmware is operable to use an ACPI method to cause the operating system to idle said one processor module and pass control over said one processor module to the system firmware.

16. The system of claim 12 further comprising:
    status information stored to non-volatile data storage, wherein said system firmware is operable to update the status information to indicate that said one processor module is not healthy responsive to detection of LOL for said one processor module, and wherein the system firmware is operable to update the status information to indicate that said one processor module is healthy responsive to reestablishing lockstep for said one processor module.

\* \* \* \* \*